(12) United States Patent
Babkin et al.

(10) Patent No.: US 10,999,344 B1
(45) Date of Patent: May 4, 2021

(54) DYNAMIC VIDEO RESOLUTION AND QUALITY FOR IMPROVED VIDEO CONFERENCING

(71) Applicant: Google LLC, Mountain View, CA (US)

(72) Inventors: Sergey Anatolyevich Babkin, Woodinville, WA (US); Myles Jordan, Snohomish, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/901,349

(22) Filed: Jun. 15, 2020

(51) Int. Cl.
*H04N 7/15* (2006.01)
*H04L 29/06* (2006.01)

(52) U.S. Cl.
CPC ............ *H04L 65/605* (2013.01); *H04L 65/80* (2013.01); *H04N 7/15* (2013.01)

(58) Field of Classification Search
CPC .................................. H04L 29/06; H04N 7/15
USPC ............................................ 348/14.01–14.16
See application file for complete search history.

(56) References Cited

U.S. PATENT DOCUMENTS

| | | | |
|---|---|---|---|
| 7,593,032 B2 | 9/2009 | Civanlar et al. | |
| 7,830,409 B2 | 11/2010 | Hwang et al. | |
| 9,843,606 B1 | 12/2017 | Vendrow et al. | |
| 9,900,553 B2 | 2/2018 | Whynot | |
| 10,284,775 B2 | 5/2019 | Kim et al. | |
| 2010/0149301 A1* | 6/2010 | Lee ................ | H04N 21/440281 348/14.08 |
| 2011/0310217 A1* | 12/2011 | Lee ...................... | H04N 19/172 348/14.08 |
| 2015/0201161 A1 | 7/2015 | Lachapelle et al. | |
| 2016/0065625 A1 | 3/2016 | Ouyang et al. | |
| 2017/0013233 A1* | 1/2017 | Kuusela ................... | H04N 7/15 |
| 2017/0324785 A1* | 11/2017 | Taine ...................... | H04L 51/10 |
| 2019/0118083 A1 | 4/2019 | Van der Laan et al. | |
| 2019/0238794 A1* | 8/2019 | Barkley .................. | H04N 7/14 |

FOREIGN PATENT DOCUMENTS

JP 2013042492 2/2013

* cited by examiner

*Primary Examiner* — Melur Ramakrishnaiah
(74) *Attorney, Agent, or Firm* — Dority & Manning. P.A.

(57) ABSTRACT

Systems and methods for multi-attendee video conferencing are described. A system can receive a request to stream video associated with a first attendee for a high-resolution display region and video associated with a second attendee for a low-resolution display region at a client device. The system can generate a first video stream for the first attendee at a first resolution for the high-resolution display region. The system can determine a second resolution for a second video stream for the second attendee that is larger than a requested resolution for the low-resolution display region. The system can determine a video quality for the second video stream at the second resolution based on maximizing use of a bandwidth. The system can generate the second video stream for the client device.

20 Claims, 6 Drawing Sheets

DYNAMIC VIDEO RESOLUTION AND QUALITY FOR IMPROVED VIDEO CONFERENCING

FIELD

The present disclosure relates generally to providing high-resolution video streams for multi-attendee video conferencing. More particularly, the present disclosure relates to systems and methods for improving video appearance during video-format switching events.

BACKGROUND

Multi-attendee video conferencing techniques can provide video streams to a client device for multiple attendees of a video conference. As an example, a speaking attendee may be displayed in a high-resolution display region while non-speaking attendees may be displayed in low-resolution display regions. When a non-speaking attendee switches to a speaking role, the new speaking attendee video can be provided in the high-resolution display region. If a low-resolution video stream is enlarged to match the resolution of the high-resolution display region, a low quality video stream may be provided.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by one or more processors, one or more requests to simultaneously stream video associated with a first attendee for a high-resolution display region at a client device and video associated with a second attendee for a low-resolution display region at the client device. The method can include generating, by the one or more processors in response to the one or more requests, a first video stream associated with the first attendee at a first resolution corresponding to the high-resolution display region. The method can include identifying, by the one or more processors, a highest resolution previously requested by the client device for one or more previous video streams. The method can include determining, by the one or more processors based on the highest resolution previously requested, a second resolution for a second video stream associated with the second attendee, wherein the second resolution is larger than a requested resolution for the low-resolution display region. The method can include determining, by the one or more processors, a video quality for the second video stream at the second resolution based at least in part on maximizing use of a bandwidth associated with the low-resolution display region. The method can include generating, by the one or more processors in response to the one or more requests, the second video stream at the second resolution and the determined video quality for the client device Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
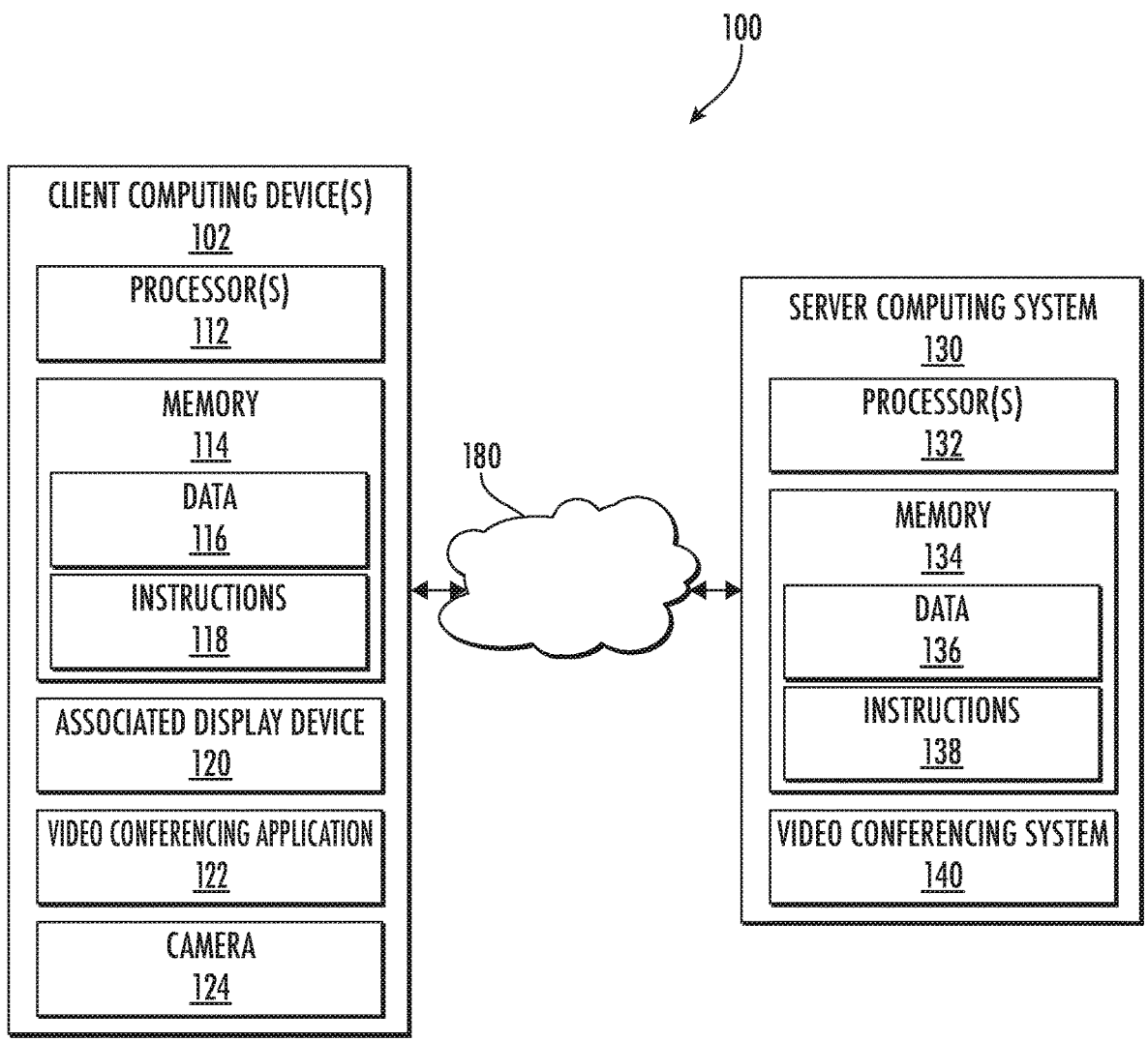
FIG. 1 depicts a block diagram of an example computing system according to example embodiments of the present disclosure

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a multi-attendee video conference technique for improving the appearance of video during video format switching events (e.g., switching from a low-resolution display region to a high-resolution display region for an attendee). More particularly, a video stream for a low-resolution display region (e.g., a thumbnail representation) at a client device can be generated with a resolution that is larger (also referred to as higher) than a resolution of the low-resolution display region and with a video quality (e.g., level of encoding, etc.) that is dynamically selected to maximize use of bandwidth allocated for the low-resolution display region. In this manner, the stream for the low-resolution display region can be provided at an increased resolution and a quality that is optimized for bandwidth associated with a low resolution display region. This, in turn, can preserve the provision of bandwidth capacity by providers and further enable an improved appearance of the video for the particular attendee if the video is enlarged for the high-resolution display region. For example, a client device can receive a first video stream for a low-resolution display region (e.g., a thumbnail) where the first video stream has a resolution higher than the low-resolution display region. The client device can then receive an input (e.g., from a server, a user, etc.) indicating that the first video stream currently displayed is requested to be displayed in a high-resolution display region. In response, the client device can seamlessly transition from displaying the first video stream in the low-resolution display region to the high-resolution display region, as the base resolution of the first video stream already exceeds the resolution of the low-resolution display region. The client device can display this first video stream temporarily in the high-resolution display region until a second video stream generated for the high resolution display region is received. Because the first video stream has a higher resolution than is typically provided for a low-resolution display region, it will have a better appearance when it is shown in the high resolution display region. For example, even if the first video stream has a relatively low quality (e.g., low bitrate), its higher resolution will provide an improved visual appearance when compared with typical video streams provided for low-resolution display regions This technique can be particularly useful in applications where video associated with a first attendee (e.g., a currently-speaking attendee or dominant speaker) is shown in a high-resolution region (e.g., full-window display region) and video associated with other attendees is shown in a low-resolution region (e.g., thumbnail display region).

More particularly, contemporary video conferencing systems are generally capable of adjusting the displayed resolution at which conference participants are displayed. As an example, such systems can detect that a first participant is speaking (sometimes referred to as a dominant speaker), and in response, display the video stream associated with the first participant in a high-resolution display region (e.g., a full-screen format, etc.). In other examples, a user may provide input to select a particular attendee as a dominant attendee or speaker. If a second participant begins to speak, the video stream associated with the first speaker can be displayed in a low-resolution display region, for example as a small format thumbnail. Similarly, the video conferencing system can display the video stream of the second participant in the high-resolution display region. In some instances, the current video stream of the second attendee for the low-resolution display region is shown in the high-resolution display region while awaiting receipt of a higher resolution stream for the second attendee. In this interim timeframe, scaling of the stream for the low-resolution display to fully occupy the high-resolution display region can lead to a poor initial video appearance for the second speaker in the high-resolution display region. Because the video stream has a resolution lower than that of the high display region, it may appear pixelated or otherwise appear inferior to the previously displayed video stream.

In accordance with example embodiments of the present disclosure, the resolution and video quality of a video stream for an attendee associated with a low-resolution display region can be dynamically selected so as to provide for improved transition events at a client device displaying multiple video streams. The resolution for a dominant speaker or otherwise selected attendee may correspond to the resolution of the high-resolution display region at the client device. For example, the resolution of a dominant speaker video stream can be static (e.g., corresponding to the high-resolution display region). On the other hand, the resolution of a video stream for a non-dominant speaker can be dynamically selected. More particularly, the selection of the non-dominant stream resolution can vary based on the requestor of the video stream (e.g., a client device, etc.). As an example, the non-dominant stream resolution may vary based on the highest resolution previously requested by the requestor. For example, historical resolution data for previous client device sessions can be stored and later used to identify a highest previous requested resolution by the requestor. As another example, the non-dominant stream resolution may vary based on a bandwidth of the requestor. For example, the non-dominant stream resolution may be reduced as the bandwidth of the requestor is reduced (e.g., due to signal loss, service provider bandwidth reductions, etc.). As yet another example, the non-dominant stream resolution may vary based on a display quality of the requestor. For example, a non-dominant stream resolution may be reduced for a requestor with a lower quality display (e.g., a lower resolution, etc.)

Similarly, in some implementations, the video quality of a dominant video stream can be static (e.g., corresponding to the high-resolution display region), while a non-dominant video quality can be dynamically selected. More particularly, the selection of the non-dominant video quality can vary based on maximizing an allocated bandwidth for the low-resolution display region of the requestor. In some implementations, the video quality can be determined using an encoding scheme (e.g., a compression scheme, a codec, etc.). As an example, a first codec can provide relatively lossy encoding (e.g., relatively lower video quality) with a correspondingly lower bandwidth utilization. A second codec can provide relatively lossless encoding (e.g., relatively higher video quality) with a correspondingly higher bandwidth utilization. The codec to be utilized (and corresponding video quality) can vary based on the bandwidth utilization of both codecs and the bandwidth allowance allocated to the low-resolution display region of the requestor.

When the non-dominant speaker's stream is received by a client device of the requestor, the non-dominant stream resolution can, in some implementations, be higher than the resolution associated with the low-resolution display region. As such, the client device of the requestor can scale (e.g., downscale, etc.) the stream resolution to correspond to the low-resolution display region. More particularly, a processor of a client device of the requestor can scale the non-dominant stream resolution to the resolution compatible with the low-resolution display region using a downscaling algorithm (e.g., lanczos filtering, Spline filtering, bilinear interpolation, bicubic interpolation, etc.). In such fashion, the resolution of the non-dominant speaker stream can vary dynamically at a resolution higher than the low-resolution display region while still being scaled to properly display in the low-resolution display region.

In some implementations, a computing device (e.g., the client device, a server, etc.) can determine that the speaking roles of attendees have changed (e.g., a non-dominant speaker changing to a dominant speaker, etc.). The client device can request new streams that correspond to the changed roles of the attendees (e.g., a higher quality stream for the dominant speaker, etc.). While waiting for a high-resolution/high quality video stream for the newly determined dominant speaker, the client device can display the existing video stream for the low-resolution display region in the high-resolution display region. As an example, a first non-dominant attendee can have a first video stream corresponding to the low-resolution display region. The first attendee can switch to a dominant speaker role. While waiting for the first attendee's new video stream, the client device can temporarily display the first attendee's first video stream in the high-resolution display region. In such fashion, the client device can quickly and seamlessly transition between streams without suffering a loss of service. Moreover, because the video stream for the low-resolution display region is generated at a higher resolution than the low-resolution display region, it will provide a better visual appearance than a video stream having the low-resolution of the low-resolution display region. While the video quality may be less than that of a typical video stream for the high-resolution display region, it may nevertheless exhibit improvements relative to a low-resolution video stream scaled to fit the high-resolution display region.

In some implementations, a computing device (e.g., a server computing device) can receive a request from a client device for new video streams that reflect a change in speaking roles. In response, the server can generate updated video streams to match the changed speaking roles. As an example, the role of a first attendee can switch from a non-dominant speaking role to a dominant speaking role. The server can generate a new stream for the first attendee at a high quality and a high-resolution corresponding to the high-resolution display region. Further, the server can generate a new stream for the former dominant speaker at a reduced resolution and/or quality based on the client device to which the new stream will be transmitted. For example, the stream for the new non-dominant speaker can be generated at a resolution corresponding to the highest resolution previously requested by the requesting device and a video quality that maximizes the bandwidth allocated for video streams associated with low-resolution display regions. In such fashion, the server can request and receive streams of varying quality and/or resolutions based on the current speaking status of the attendees.

In accordance with example embodiments of the present disclosure, a video conferencing technique is provided that includes multiple high-resolution video streams with dynamically adjusted video qualities. This technique can improve the appearance of video during switching events at a client device. Moreover, the described technique can provide improved video appearance while avoiding increases in the overall bandwidth consumption of traditional systems. More particularly, example embodiments can provide high-resolution video streams for multiple attendees, including attendees that may not be a dominant speaker or otherwise associated with a high-resolution display region. To avoid increasing or overly increasing the amount of data transfer associated with non-dominant speakers, the video conferencing system can dynamically determine a video quality for one or more video streams based at least in part on optimizing a bandwidth allocation associated with the low-resolution display region (e.g., maximizing a bandwidth efficiency value, etc.). As an example, video streams for a first, second, and third attendee of a video conference can be generated. For instance, the video stream of a dominant speaker can be generated at a resolution corresponding to a high-resolution display region. The resolution of the video streams for the other attendees can be dynamically determined based on one or more criteria. For example, the resolution of the video streams for other attendees may be selected based on criteria associated with a device requesting the video streams. The video stream of a non-dominant speaker may be generated at a resolution based on a highest previously requested video stream by the requesting client device. Similarly, the video quality of the video streams can be determined based on the requested display region for the video stream. If the video stream associated with the first attendee is requested in a high-resolution display region and the video stream associated with the second attendee is requested in a low-resolution display region, the determined video quality for the second attendee's stream can be dynamically selected to maximize a bandwidth allocation to video streams associated with the low-resolution display region. At the requesting device, the video stream can be scaled down to correspond to the resolution of the low-resolution display region. If the second attendee's stream is subsequently requested in the high-resolution display region, the second attendee's stream can first be presented at its original resolution in the high-resolution display region. In such fashion, the video stream may have an improved appearance when compared to video streams having a resolution with a direct correspondence to the resolution of the low-resolution display region.

According to example embodiments, a video conferencing system can receive one or more requests to simultaneously stream video. The one or more requests can be issued by a client device in association with viewing video streams of a first attendee (e.g., an attendee of a video conference) in a high-resolution display region at the client device (e.g., laptop, smartphone, desktop, etc.) and with a second attendee for a low-resolution display region at the client device. High and low-resolution display regions can refer to a displayed size (e.g., in pixels, etc.) of a respective attendees video stream. As an example, a high-resolution display region can utilize larger area of a display device relative to a low-resolution display region. In some examples, a high-resolution display region may include a majority of a graphical user interface of a user display device (e.g., a "fullscreen" representation, a "large window" representation, etc.). Similarly, for example, a low-resolution display region can utilize a relatively smaller portion of a user display device (e.g., a "thumbnail" representation, a "small window" representation, etc.). In some implementations, the low-resolution display region can be overlaid (e.g., on top of, in front of, etc.) on the high-resolution display region. As an example, a video stream displayed in a high-resolution display region can utilize the entirety of a graphical user interface of the user display device while multiple video streams displayed in low-resolution display regions can be overlaid on the video stream in the high-resolution display region (e.g., as thumbnail streams along the bottom edge or other portion of the high-resolution display region, etc.).

In some implementations, the size of the high and/or low-resolution display regions can be described as a pixel resolution. As an example, the high-resolution display region may be described as having a resolution of 800×800 pixels while the low-resolution display region may be described having as a resolution of 100×100 pixels. Additionally, or alternatively, the size and/or proportions of the respective display regions can be described using some other metric (e.g., size units, units respective to the proportions of a user display device, etc.). As an example, the high-resolution display region can be described as utilizing 75% of the available space (e.g., available number of pixels) of a user display device. In such fashion, a video stream display region can define a respective "size" relative to other display regions, while the actual resolution of the display regions can be extrapolated based on the size and/or capacity of a user display device.

In response to the one or more requests, a first video stream associated with a first attendee can be generated. The first video stream can be generated at a first resolution (e.g., 1920×1080 pixels, etc.). The first resolution can correspond to the high-resolution display region. As an example, the high-resolution display region can be described as having a resolution of 1920×1080 pixels, and the first resolution can correspond to the resolution of the high-resolution display region. For example, the first stream resolution may have a resolution identical to the described high-resolution display region (e.g., 1920×1080 and 1920×1080, etc.). For another example, the first stream resolution may have a resolution that is substantially similar to the described resolution of the high-resolution display region (e.g., 1280×720 and 1920×1080 respectively, etc.).

In some implementations, the high-resolution display region may be described as having certain dimensions and/or proportions (e.g., an aspect ratio, screen percentage, etc.). The first stream resolution can correspond to the high-resolution display region. As an example, the high-resolution display region may be described as having a 16:9 aspect ratio and utilizing 75% of the display space capacity for a user display device. The corresponding first stream resolution can have a resolution matching the 16:9 aspect ratio of the large format (e.g., 1920×1080, etc.) or provide a resolution that is sufficient to enable display on 75% of the display space capacity of user display device(s). In such fashion, the stream resolution can be provided in a manner sufficient to enable the representation of video streams using various display regions (e.g., high or low-resolution display regions, etc.).

A highest resolution that the client device has previously requested for one or more previous video streams can be identified. More particularly, the system can determine a highest resolution of a video stream that was requested by the client device. In some implementations, historical resolution data for previous client device sessions can be stored in one or more computing devices and/or systems that include and/or are otherwise associated with the one or more processors. The historical resolution data can be used to identify a highest previous requested resolution by the client device. As an example, the historical resolution data may indicate that the highest resolution requested by a client device was 1920×1080 pixels. Alternatively, in some implementations, determining the second resolution for the second video stream can include identifying a common and/or preferred resolution for the client device. As an example, the client device can include, within the request, information that identifies a preferred and/or optimal resolution for the second video stream. As another example, the request can include technical details for the client device (e.g., bandwidth allocation, display resolution, hardware components, etc.) that can be used to determine a preferred and/or optimal resolution for the second video stream. As yet another example, the historical resolution data can be analyzed (e.g., using machine-learned model(s), etc.) to determine a preferred and/or optimal resolution for the second video stream.

A second resolution can be determined for a second video stream associated with the second attendee such that the second resolution is larger than the low-resolution display region. More particularly, a second resolution can be determined for the second video stream based on the previously identified highest resolution requested by the client device. The second resolution can be larger (e.g., in number of pixels, etc.) than the equivalent size of the low-resolution display region. As an example, a low-resolution display region can be described as having a size of 100×100 pixels. The second video stream can be determined to have a size of 1920×1080 pixels. It should be noted that, in some implementations, the size of the second video stream is not necessarily equivalent to the size of the high-resolution display region. As an example, the size of the second video stream may be a size between the high-resolution display region and the low-resolution display region. In such fashion, scaling the second video stream to a high-resolution display region would require relatively less expansion of pixels (and corresponding quality loss). Alternatively, in some implementations, the size of the second video stream can be equal to the high-resolution display region and/or the resolution of the first video stream.

A video quality for the second video stream can be determined. The video quality can be determined based at least in part on maximizing use of a bandwidth associated with the small format representation. More particularly, the video quality can be determined so as to maximize the bandwidth allowance allocated to the small format representation. In some implementations, the video quality can be determined using an encoding scheme (e.g., a compression scheme, a codec, etc.). As an example, a first codec can provide relatively lossy encoding (e.g., relatively lower video quality) with a correspondingly lower bandwidth utilization. A second codec can provide relatively lossless encoding (e.g., relatively higher video quality) with a correspondingly higher bandwidth utilization.

More particularly, the codec to be utilized (and corresponding video quality) can be determined based on the bandwidth utilization of both codecs and the bandwidth allowance allocated to the low-resolution display region. As an example, providers (e.g., video conference providers, internet service providers, connectivity providers, etc.) can reduce a bandwidth capacity for a user of a video conferencing service based on previous bandwidth utilization. For example, if a user only utilizes a small amount of bandwidth over a time period (e.g., streaming a low quality 100×100 stream for a low-resolution display region, etc.), a provider can, based on this previous utilization, reduce the predetermined total bandwidth capacity for the user. As such, if the user was to attempt to subsequently stream a 1920×1080 stream for a high-resolution display region, the user's predetermined bandwidth capacity would be insufficient. Accordingly, a video conferencing system in accordance with example embodiments can provide a resolution for the video stream that configured to maximize a predetermined bandwidth (e.g., a predetermined bandwidth capacity, allowance, etc.) such that the user's total bandwidth capacity is undiminished by provider(s).

A second video stream can be generated at the second resolution and the determined video quality for the client device. At the client device, the second video stream can be scaled to the resolution of and/or a resolution compatible with the low-resolution display region. As an example, at least one processor of the one or more processors can be located on a client device that displays the video stream(s). The at least one processor at the client device can scale the second video stream to a third resolution that is sufficient to enable display in the low-resolution display region. Additionally, or alternatively, the client device can, in some embodiments, perform scaling operations on the second video stream when received, as will be discussed in greater detail with regards to the figures.

In some implementations, the second video stream can be displayed at the second resolution and the determined video quality for the large format representation at the client device. As described previously, the second video stream resolution can correspond to the high-resolution display region, but can, in some implementations, be a different resolution than the resolution(s) of the high-resolution display region. In such instances, the second resolution can be scaled to fit the large format representation by the at least one processors of the client device. As an example, the at least one processor at the client device can determine a resolution compatible with the large format representation and scale the second resolution to the determined resolution. For example, if the second resolution was 1280×720, and the corresponding large format representation resolution was 1920×1080, the second resolution could be scaled to the large format representation by the at least one processor at the client device.

In some implementations, a third video stream associated with the second attendee can be received at the first resolution and at a second video quality based on one or more requests. More particularly, the second video quality can be a second video quality suitable for display in the high-resolution display region. In some implementations, the second video quality of the third video stream can be of a higher quality than the determined video quality of the second video stream. As an example, the second video stream can be displayed in the high-resolution display region. In response, the one or more processors can receive a third video stream with a second video quality that is more suitable (e.g., higher quality, etc.) for display in a high-resolution display region.

In some implementations, the second video quality can be provided based on the utilization of one or more encoding schemes that are different than the encoding scheme(s) utilized for the determined video quality. More specifically, encoding scheme(s) (e.g., compression schemes, codecs, etc.) can be selected that produce a higher video quality than the previously determined video quality. In some implementations, the encoding scheme(s) can be implemented at the client-device level. As an example, the client device associated with the second attendee may determine that the video stream associated with the second attendee is being and/or will be displayed in a large format representation. The client device can, in response, utilize different encoding scheme(s) to increase the video quality of the video stream data sent to the one or more processors of the present embodiment.

Alternatively, or additionally, in some implementations, the encoding scheme(s) can be implemented by one or more processors at a server computing device, such as may be associated with a cloud-based service provider. As an example, the one or more processors can determine that the second attendee is being and/or will be displayed in a large format representation. The processor(s) can, in response, utilize different encoding scheme(s) to increase the video quality of the video stream data provided to one or more client devices associated with one or more other attendees.

In some implementations, the video stream data includes one or more key frames and a plurality of subsequent frames. The key frames can include full frame data for the video stream captured by client device(s) of the attendees. More particularly, the key frames can fully capture the attendee and the background of the attendee to establish a baseline frame. The frames subsequent to the key frame can include a difference between each of the frames and the frame respectively preceding each frame. As an example, a key frame can include a full depiction of an attendee and the environment behind the attendee (e.g., a gray wall). A first frame subsequent to the key frame can include data representing any differences between the first frame and the key frame. For example, if the background depicted in the key frame (e.g., the gray wall) has not changed in any way (e.g., no movement has been registered, etc.), the first frame can omit data associated with the depiction of the background. A second frame can be subsequent to the first frame. Similarly, if the background depicted in the preceding frame (e.g., the first frame) has not changed, the second frame can omit data associated with the depiction of the background. In such fashion, the video stream data can omit redundant data transmission by only including data necessary to depict changes in the attendee's video stream.

The present disclosure provides a number of technical effects and benefits. As one example technical effect and benefit, the systems and methods of the present disclosure enable seamless transitions during format-switching events associated with multi-attendee video conferencing. More particularly, the present disclosure avoids the significant lag time and quality degradation associated with expanding a low-resolution video stream for display in a high-resolution display region while waiting to receive a high-resolution video stream. Further, the video quality of the video stream can be adjusted quickly and seamlessly to provide higher-quality video streams without having to change the base resolution of the received video stream. In such fashion, attendee appearance and overall image quality of video streams is greatly increased in comparison to previous video conferencing techniques during format-switching events.

As another technical effect and benefit, the present disclosure provides for bandwidth utilization sufficient to preserve continuous system-level bandwidth allocation for attendees of the video conference. More particularly, some systems (e.g., video-conferencing systems, ISP's, other service provider systems, etc.) may dynamically adjust the maximum bandwidth allocation for a client device based on the average utilization of bandwidth for the device (e.g., a "use it or lose it" system). By providing high-resolution streams at a variable quality, the present disclosure can reserve a maximum optimal bandwidth for the client device of attendees without overwhelming the bandwidth limits of the attendees client devices.

As another technical effect and benefit, the present disclosure provides for improved presentation of existing video streams at a client device prior to receiving a keyframe for a new video stream. Generally, contemporary video conferencing techniques provide a new key frame prior to providing a new video stream at a different resolution (e.g., replacing a low-resolution video stream with a high-resolution video stream etc.). As such, if a video stream is streamed at a relatively smaller resolution (e.g., a resolution smaller than and/or incompatible with the high-resolution display region, etc.), a new key frame is generated for the new video stream that is compatible with the high-resolution display region. The present disclosure enables an improved display of video streams generated for low-resolution display regions at high-resolution display regions during format-switching events due to the increased bandwidth and/or quality of the video streams provided for the low-resolution regions.

With reference now to the Figures, example embodiments of the present disclosure will be discussed in further detail.

FIG. 1 depicts an example client-server environment 100 according to example embodiments of the present disclosure. The client-server environment 100 includes a client computing device 102 and a server computing system 130 that are connected by and communicate through a network 180. Although a single client computing device 102 is depicted, any number of client computing devices 102 can be included in the client-server environment 100 and connect to server computing system 130 over a network 180.

In some example embodiments, the client computing device 102 can be any suitable device, including, but not limited to, a smartphone, a tablet, a laptop, a desktop computer, or any other computer device that is configured such that it can allow a user to participate in a video conference. The client computing device 102 can include one or more processor(s) 112, memory 114, an associated display device 120, a video conferencing application 122, and a camera 124.

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the client computing device 102 and the server computing device 130 (e.g., one or more video conferencing applications 122, etc.). The client computing device 102 can implement the instructions to execute aspects of the present disclosure, including directing communications with server computing system 130, providing a video conferencing application 122 and/or video stream to a user, scaling a received video stream to a different resolution display region, and/or generating and sending instructions to the server computing system requesting a new video stream for a display region.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130), that can be retrieved, manipulated, created, or stored by the one or more processor(s) 112. In some example embodiments, such data can be accessed and displayed to one or more users of the client computing device 102 during a video conference or transmitted to the server computing system 130.

The client computing device 102 can execute a video conferencing application 122. The video conferencing application can capture image data from a camera 124 and transmit that data to the server computing system. The client computing device 102 can receive, from the server computing system 130 image data from one or more other participants of the video conference (e.g., other client computing devices 102). The client computing device 102 can then display the received image data to users of the client computing device 102 on associated display device 120. In some example embodiments, the camera 124 collects image data from one or more users. The camera can be any device capable of capturing visual data.

More particularly, the client computing device 102 can receive one or more video streams from the server computing system 130. The client computing device 102 can, as an example, display the received video streams in the associated display device 120 (e.g., a laptop display device, a smartphone display device, a communicatively connected display device, etc.) in high-resolution display region(s) and/or low-resolution display region(s). For example, the client computing device 102 can receive a first video stream for a first attendee from the server computing system 130. The first video stream can be received having a first resolution that corresponds to the high-resolution display region. The client computing device 102 can receive a second video stream associated with a second attendee. The second video stream can be received having a second resolution that corresponds to the low-resolution display region. The client computing device 102 can display the first video stream in the high-resolution display region of the associated display device 120 and can display the second video stream in a low-resolution display region of the associated display device 120.

It should be noted that the display region(s) (e.g., high-resolution, low-resolution, etc.) can correspond to an amount of screen space (e.g., as measured by a discrete number of pixels, etc.) or proportion of screen space of the associated display device 120. As an example, a high-resolution display region of the associated display device 120 can correspond to 80% of the available screen space of the associated display device 120 while two low-resolution display regions can each correspond to 10% of the available screen space of the associated display device 120. Further, in some implementations, the size and/or proportions of the display region(s) can vary based on other processes and/or operations of the client computing device 102. As an example, the client computing device 102 may execute the video conferencing application 122 in a resizable window. If the size of the executed window of the video conferencing application 122 is adjusted (e.g., by a user input, etc.), the size of the display region(s) can be proportionally adjusted.

Further, in some implementations, the display format of the video streams on the associated display device 120 can be adjusted. As an example, the client computing device 102 can allocate the entirety of the screen space of the associated display device 120 to the high-resolution display region while overlaying two low-resolution display regions on top of the high-resolution display region (e.g., as thumbnails, etc.). As another example, in response to receiving a user input (e.g., a command to alter the display format of the video streams, etc.), the client computing device can allocate 50% of the screen space of the associated display device 120 to the high-resolution display region while allocating 25% of the screen space to two low-resolution display regions. In such fashion, the client computing device 102 can adjust the format and/or size of the display region(s) in response to a user input and/or in response to a resizing of the video conference application 122.

Additionally, or alternatively, in some implementations, the client computing device 102 can generate a video stream and send the video stream to the server computing system 130 (e.g., via network(s) 180). More particularly, the client computing device 102 can capture a video stream using camera 124 (e.g., an integrated webcam, communicatively connected camera device, etc.). The client computing device 102 can encode the captured video (e.g., as specified by instructions 118, etc.). In some implementations, the client can encode the captured video at a high-resolution and a high quality. As an example, the client can encode the captured video at a resolution and quality that is as high or higher than the resolution and quality of the high-resolution display region. Alternatively, in some implementations, the resolution and/or the quality of the client computing device 102's video stream can be based at least in part on request(s) received from the server computing system 130. As an example, the client computing device 102 can generate a first video stream of a video conference attendee using the camera 124 and a first encoding scheme. The server computing system 130 can request that the client computing device 102 encode the captured video using a second encoding scheme configured to increase the quality of the video stream. In response, the client computing device 102 can utilize the camera 124 and a second encoding scheme to generate a second video stream and send the second video stream to the server computing system 130 (e.g., via network 180, etc.). In such fashion, the quality and/or resolution of the video stream(s) provided by the client computing device 102 can vary based at least in part on requests received from the server computing system 130.

In accordance with some example embodiments, the server computing system 130 can include one or more processor(s) 132, memory 134, and a video conferencing system 140. The memory 134 can store information accessible by the one or more processor(s) 132, including instructions 138 that can be executed by processor(s) and data 136.

The server computing system 130 can be in communication with one or more client computing device(s) 102 using a network communication device that is not pictured. The network 180 can be any type of communications network, such as a local area network (e.g., intranet), wide area network (e.g., Internet), or some combination thereof. In general, communication between the client computing device 102 and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can include a video conferencing system 140. In some implementations, the video conferencing system 140 can be configured to facilitate operation of the video conferencing application 122 executed by one or more client computing devices 102. As an example, the video conferencing system 140 can receive video streams from a plurality of client computing devices 102 (e.g., via network 180) respectively associated with a plurality of video conference attendees. The video conferencing system 140 can provide the video streams to each of the client computing devices 102. Further, the video conferencing system 140 can manage provided stream quality by receiving high quality, high-resolution streams from client computing devices 102 and then managing the quality and resolution of streams provided to client computing devices 102. As an example, the video conferencing system 140 can receive high quality, high-resolution video streams from a first and second client computing devices 102. The video conferencing system 140 can then provide a low quality, low-resolution stream of the first client computing device 102 to the second client computing device 102 and a high quality, high-resolution video stream of the second client computing device 102 to the first client computing device 102 (e.g., based on bandwidth, preferences, device hardware resources, etc.).

Alternatively, in some implementations, the video conferencing system 140 can manage provided stream quality by transmitting requests to client computing devices 102 to provide video streams with a certain quality and/or resolution. In such fashion, the server computing system 130 can utilize video conferencing system 140 to facilitate the functionality of the video conferencing applications 122 on each client computing device 102.

Figure 2:
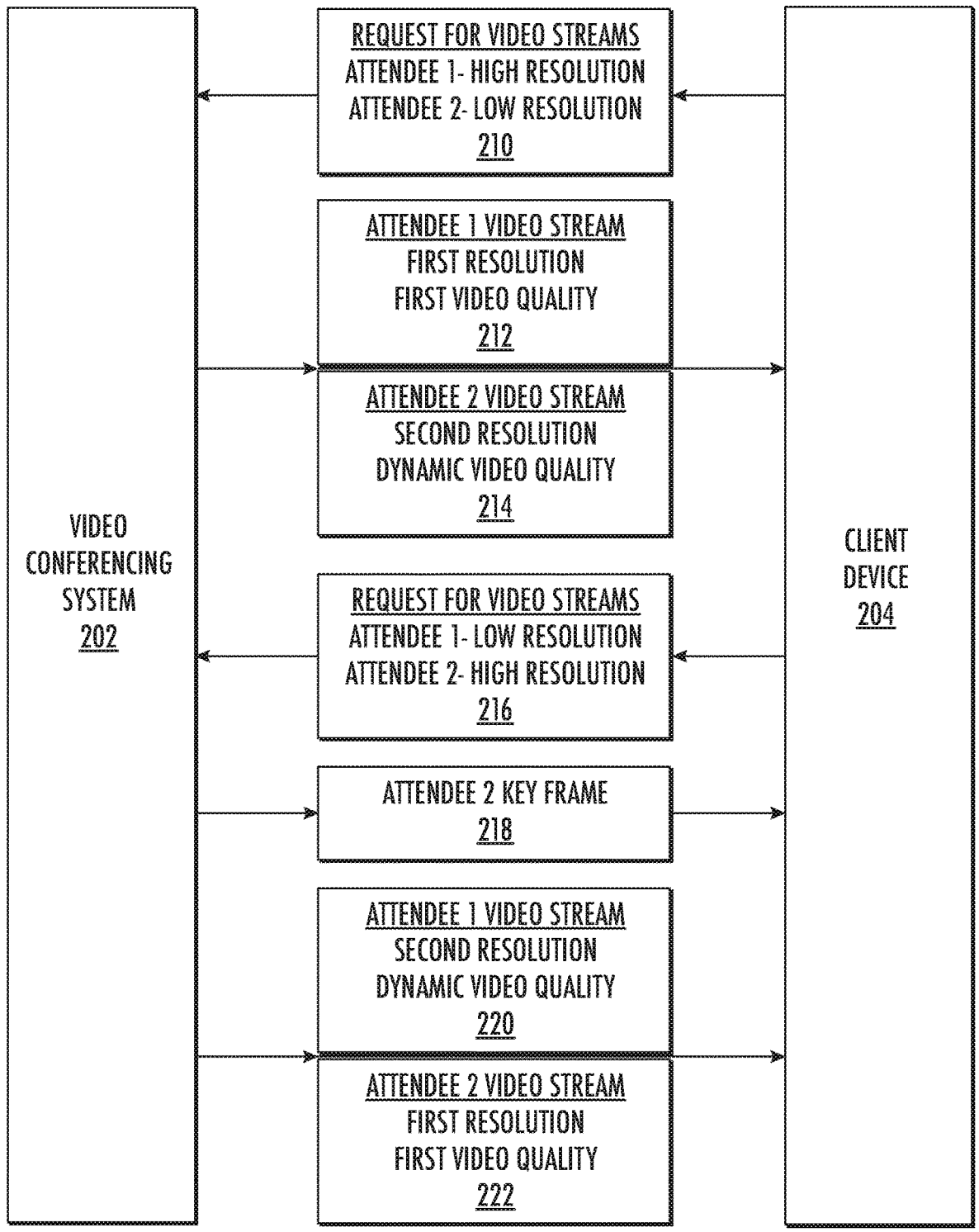
FIG. 2 depicts a flow diagram for providing video streams to a client device at varying video qualities according to example embodiments of the present disclosure.

FIG. 2 depicts a flow diagram for providing video streams to a client device 204 at varying video qualities according to example embodiments of the present disclosure. The client device 204 can be a device associated with an attendee of the video conference (e.g., a laptop computer, smartphone, desktop computer, tablet, etc.). As an example, the client device 204 can be a laptop of a video conference attendee that is executing a video conferencing application. Further, in some implementations, the client device 204 can include a capture device (e.g., a webcam, communicatively coupled video capture device, etc.). As an example, the video conferencing application executed on the client device 204 may display video conference video streams on the display of the client device 204 while also capturing the attendee associated with the client device 204 with a corresponding capture device (e.g., a webcam, etc.). The client device 204 can provide the captured video stream to the video conferencing system 202 (e.g., via the videoconferencing application, etc.) while also receiving video streams from the video conferencing system 202. In such fashion, a number of client devices can both receive and send video streams of associated video conference attendees.

Video conferencing system 202 can receive a request 210 from client device 3 204 to stream video associated with attendee 1 for a high-resolution display region at client device 204 and to stream video associated with attendee 2 for a low-resolution display region at client device 204. The video conferencing system 202 can provide video streams 212 for attendee 1 and video stream 214 for attendee 2. The video streams 212, 214 can be associated with attendees of the video conference (e.g., captured from an attendee's computing device, etc.). As an example, video stream 212 can be associated with a first attendee of the video conference and video stream 214 can be associated with a second attendee of the video conference.

Video stream 212 can be a video stream having a first resolution and a first video quality. The first resolution of video stream 1 can correspond to a high-resolution display region of the client device 204. As such, the first resolution can be considered a high-resolution in example embodiments. In some examples, the first resolution can correspond to a requested resolution for attendee 1 as included in request 210. The first video quality can be a high video quality (e.g., a quality that generally corresponds to the high-resolution display region, etc.). More particularly, the first resolution of video stream 1 can include a large resolution that matches the resolution of a high-resolution display region of the client device 204. As an example, a high-resolution display region can have a size of 1920×1080 pixels. The corresponding video stream 212 can have a resolution of 1920×1080 pixels. Further, the first video quality of video stream 212 can correspond to the high-resolution display region. More particularly, the video quality can be a quality that is optimized for display in a high-resolution display region. As an example, the video conferencing system 202 can use an encoding scheme to encode the video stream 212 such that there is minimal loss in the encoded video stream, providing a "high" quality to the video stream. As such, the video stream 212 can be displayed at the client device 204 in the high-resolution display region without significant quality degradation.

In some implementations, video stream 212 can be generated for a first attendee corresponding to a dominant speaker role of the video conference attendees. As an example, a computing system (e.g., the video conferencing system 202, the client device 204, etc.) can determine that a first attendee is currently speaking and assign the first attendee a dominant speaker role. Based on the roles of the attendees (e.g., dominant speaker, non-dominant speaker, etc.), the video conferencing system 202 can associate various video streams with high-resolution display region(s) or low-resolution display region(s) of the client device 204.

Video stream 214 can be a video stream having a second resolution and a dynamically selected video quality. The second resolution can be higher than the resolution requested by client device 206 for the low-resolution display region. In some examples, the second resolution is selected based on a highest resolution video stream requested by client device 204. Video stream 214 can include lower resolution video relative to video stream 1 in some examples. In other examples, video stream 2 can include the same resolution as video stream 1. Video stream 214 can include a second video quality that is dynamically selected by the video conferencing system. The second video quality can be, but is not necessarily, lower than the first video quality.

The second video quality of video stream 214 can be dynamically determined by the video conferencing system based on maximizing the use of a bandwidth of the client device 204. More particularly, the second video quality of video stream 214 can be dynamically determined to maximize a bandwidth that is sufficient to avoid a loss of bandwidth capacity associated with low-bandwidth application usage. For example, the video stream 214 for the attendee 2 can be generated at a resolution corresponding to the highest resolution previously requested by the client device 204 and a video quality that maximizes the bandwidth allocated for video streams associated with low-resolution display regions of the client device 204. As an example, some server provider(s) (e.g., internet service providers, video conference service providers, etc.) can dynamically lower a bandwidth capacity for an application and/or a client computing device based on a current bandwidth usage. By dynamically determining the video quality of video stream 214, the video conferencing system can preserve a sufficient bandwidth capacity for the client computing device. Alternatively, or additionally, in some implementations, a bandwidth-limited client computing device can have a certain amount of bandwidth allocated to low-resolution display region(s) and a high-resolution display region, and the second video quality of video stream 214 can be dynamically determined based on the bandwidth allocation(s).

Video conferencing system 202 can provide video stream 2 with a second resolution that is higher than the resolution associated with the low-resolution display region. More particularly, the second resolution can be higher than the resolution requested by client 204 for video stream 2. As such, the client device 204 can scale (e.g., downscale, etc.) video stream 2 from the higher resolution to correspond to the low-resolution display region. More particularly, in some implementations, a processor of client device 204 of the requestor can scale video stream 2 to the resolution corresponding to the low-resolution display region using a downscaling algorithm (e.g., lanczos filtering, Spline filtering, bilinear interpolation, bicubic interpolation, etc.). Client device 204 may scale video stream 214 from the second resolution as received to the resolution sent with the initial client request. In such fashion, the resolution of video stream 2 can vary dynamically at a resolution higher than the low-resolution display region while still being scaled to properly display in the low-resolution display region.

A computing device (e.g., the client device 204, the video conferencing system 202, etc.) can determine that the speaking roles of attendees associated with video streams 1 and 2 have changed (e.g., a non-dominant speaker changing to a dominant speaker, etc.). The client device 204 can request new video streams 216 that correspond to the changed roles of the attendees. For example, client device 204 may issue a request to stream video for attendee 1 at a low-resolution and to stream video for attendee 2 at a second resolution. While awaiting the newly requested video streams, client device 204 can display video stream 214 for attendee 2 in the high-resolution display region. Video stream 214 can be displayed in the high-resolution display region with or without scaling in example embodiments. For instance, video stream 214 may have a resolution already corresponding to that of the high-resolution display region. As such, client device 204 may display video stream 214 without upscaling the resolution in some examples. In such fashion, the client device 204 can quickly and seamlessly transition between video stream 212 and video stream 214 for the high-resolution display region without suffering a loss of service. Moreover, because video stream 204 is generated at a higher resolution than the low-resolution display region, it can provide a better visual appearance than if video stream 214 had a lower resolution corresponding to the resolution of the low-resolution display region. While the lower video quality of video stream 2 may be less than that of the video quality of the video stream 1, it may nevertheless exhibit improvements relative to a low-resolution video stream scaled to fit the high-resolution display region.

The video conferencing system 202 can receive request 216 from client device 204. Request 216 can request new video streams that reflect a change in speaking roles between attendee 1 and attendee 2. For example, request 216 may request that video for attendee 2 be provided at the first resolution for the high-resolution display region and video for attendee 1 be provided at a low-resolution for the low-resolution display region. In response, the video conferencing system 202 can generate updated video streams 220, 222 to match the changed speaking roles and transmit the video streams to client device 204. The quality and resolution of the updated video streams can correspond to the associated display regions for the streams on the client device 204. As an example, video stream 220 for attendee 1 can have the second resolution and a dynamically selected video quality. As video stream 220 for attendee 1 is generated for display in the low-resolution display region, the resolution and video quality for video stream 220 can be the same as or substantially similar to that of video stream 214.

Prior to sending updated video streams 220, 222 in example embodiments, the video conferencing system 202 can send one or more key frame(s) 218 for video stream 222 (e.g., a high quality, high-resolution stream for attendee 2). The key frames 218 can include full frame data for a video stream 222 captured by client device(s) of attendee 2. More particularly, the key frame(s) 218 can fully capture the attendee 2 and the background of the attendee 2 to establish a baseline frame. The frames subsequent to key frame 218 for video stream 222 can include a difference between each of the frames and the frame respectively preceding each frame. As an example, a key frame can include a full depiction of an attendee and the environment behind the attendee (e.g., a gray wall). A first frame subsequent to the key frame can include data representing any differences between the first frame and the key frame. For example, if the background depicted in the key frame (e.g., the gray wall) has not changed in any way (e.g., no movement has been registered, etc.), the first frame can omit data associated with the depiction of the background. A second frame can be subsequent to the first frame. Similarly, if the background depicted in the preceding frame (e.g., the first frame) has not changed, the second frame can omit data associated with the depiction of the background. In such fashion, the video stream data can omit redundant data transmission by only including data necessary to depict changes in the attendee's video stream.

Alternatively, in some implementations, the video conferencing system 202 can forego sending the attendee 2 key frame 218. Instead, the video conferencing system can dynamically increase the video quality of the attendee 2 video stream 222 to a first video quality while maintaining the resolution of the attendee 2 video stream 214 (e.g., the second resolution, etc.). As an example, in some implementations the second resolution of attendee video stream 214 can be equivalent to the first resolution of the attendee 1 video stream 212. Accordingly, the attendee 2 video stream 222 can continue at the first resolution (e.g., the second resolution) while dynamically adjusting the video quality to be the first video quality. In such fashion, the video conferencing system 202 can avoid the provision of unnecessary keyframes and instead merely dynamically adjust the quality of the video stream to a quality sufficient for a high-resolution display region.

The client device 204 can receive the updated video streams 220, 222 for display in the display region(s) of the client device 204 (e.g., high-resolution display region(s), low-resolution display region(s), etc. More particularly, the received updated stream 222 for the second attendee can be provided at the first resolution (e.g., a relatively high-resolution) and the first video quality corresponding to the high-resolution display region. Further, the received updated stream for the first attendee (e.g., video stream 220) can be provided at the second resolution and a dynamically selected video quality based on allocated bandwidth for the low-resolution display region(s). For example, the video stream 222 for the attendee 2 can be generated at a resolution corresponding to the highest resolution previously requested by the client device 204 and a video quality that maximizes the bandwidth allocated for video streams associated with low-resolution display regions of the client device 204. In such fashion, the client device 204 can request and receive streams of varying quality and/or resolutions based on the current speaking status of the attendees.

Figure 3:
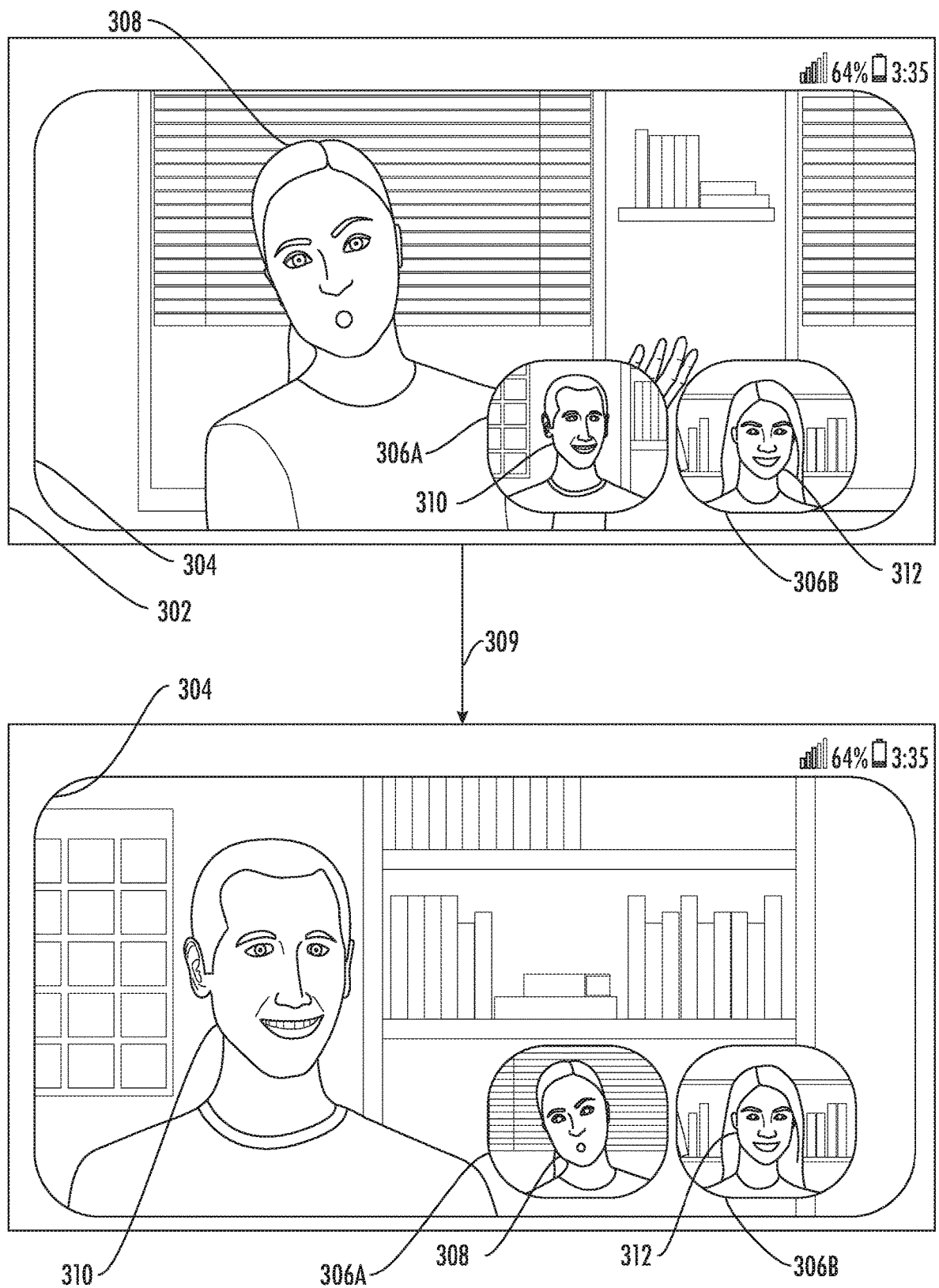
FIG. 3 depicts an example multi-attendee video conference format switching event on a mobile user computing device according to example embodiments of the present disclosure.

FIG. 3 depicts an example multi-attendee video conference format switching event on a mobile user computing device according to example embodiments of the present disclosure. Client device 302 (e.g., a smartphone, tablet, laptop computer, etc.) can display a video stream of the first attendee 308 in a high-resolution display region 304. More particularly, the speaking role of the first attendee 308 can be a dominant speaking role (e.g., the attendee that is currently speaking, etc.). Based on the dominant speaking role of the first attendee 308, the client device 302 can display the video stream of the first attendee 308 in the high-resolution display region 304. Although the high-resolution display region 304 is depicted as using the entirety of the display of client device 302, it should be noted that the high-resolution display region 304 does not necessarily need to do so. As an example, the high-resolution display region 304 may use 80% of the available display of the client device 302 while each low-resolution display region (e.g., display regions 306A and 306B, etc.) can each utilize 10% of the display space. Additionally, or alternatively, it should be noted that the low-resolution display regions 306A and 306B do not necessarily need to be overlaid on the high-resolution display region 304. In some implementations, the low-resolution display regions 306A and 306B can instead be displayed adjacent to the high-resolution display region 304.

The client device 302 can display a video stream for a second attendee 310 and a video stream for a third attendee 312 in low-resolution display regions 306A and 306B. More particularly, the speaking roles of second attendee 310 and third attendee 312 can be non-dominant speaking roles (e.g., the attendees that are not currently speaking, etc.). Based on the non-dominant speaking roles of the second attendee 310 and the third attendee 312, the client device 302 can display the video streams of the second attendee 310 and the third attendee 312 respectively in the low-resolution display regions 306A and 306B.

A role switching event 309 can occur that switches the roles of the speakers. More particularly, an attendee with a non-dominant speaker role (e.g., second attendee 310) can be determined by a computing device (e.g., the client device 302, a video conferencing system, etc.) to be a dominant speaker (e.g., based on the second attendee 310 speaking etc.). As an example, the first attendee 308 can stop speaking. Subsequently, the second attendee 310 can begin to speak. In response, a role switching event 309 can occur that switches the role of first attendee 308 from a dominant speaker to a non-dominant speaker. Further, the role switching event can switch the role of the second attendee 310 from a non-dominant speaker to a dominant speaker. In such fashion, the role switching event 309 can dynamically switch the roles of various attendees (e.g., 308, 310, 312, etc.) assign the dominant speaker role to the currently speaking attendee.

In response to the switching event 309, the client device 302 can display the video streams of the attendees in different display regions. More particularly, based on the dominant speaker role of second attendee 310, the client device 302 can display the video stream of the second attendee 310 in the high-resolution display region. In some implementations, the current resolution of the video stream of the second attendee 310, at the time of the role switching event 309, can be a resolution that is compatible with (e.g., can be displayed in) the high-resolution display region 304 and had previously been downscaled to the resolution of the low-resolution display regions 306A and 306B.

As an example, the high-resolution display region 304 can have a resolution of 1920×1080 pixels and the low-resolution display regions 306A/B can each have a resolution of 400×200 pixels. The video stream of the second attendee 310, before the role switching event 309, may have a resolution of 1920×1080, which can be downscaled to fit the resolution of the low-resolution display region 306A (e.g., by a processor of the client device 302, etc.). As such, after the role switching event 309, the 1920×1080 video stream of the second attendee 310 can be seamlessly displayed in the 1920×1080 high-resolution display region 304 in response to the updated role of attendee 310. The video stream of the second attendee 310 can, in some implementations, be utilized temporarily in the high-resolution display region until the client device 304 receives a new video stream (e.g., with a higher quality, etc.) for the second attendee 310.

Similarly, the video stream of the first attendee 308 can, before the role switching event 309, have a resolution that is compatible with the high-resolution display region 304. After the role switching event 309, the client device 302 can scale the resolution of the video stream of the first attendee 308 to be compatible with the low-resolution display region 306A. More particularly, a processor of a client device 302 can scale the video stream resolution of the first attendee 308 to the resolution compatible with the low-resolution display region using a downscaling algorithm (e.g., lanczos filtering, Spline filtering, bilinear interpolation, bicubic interpolation, etc.). In such fashion, the client device 302 can seamlessly downscale the resolution of the video stream of the first attendee 308 for display in the low-resolution display region 306A.

Figure 4:
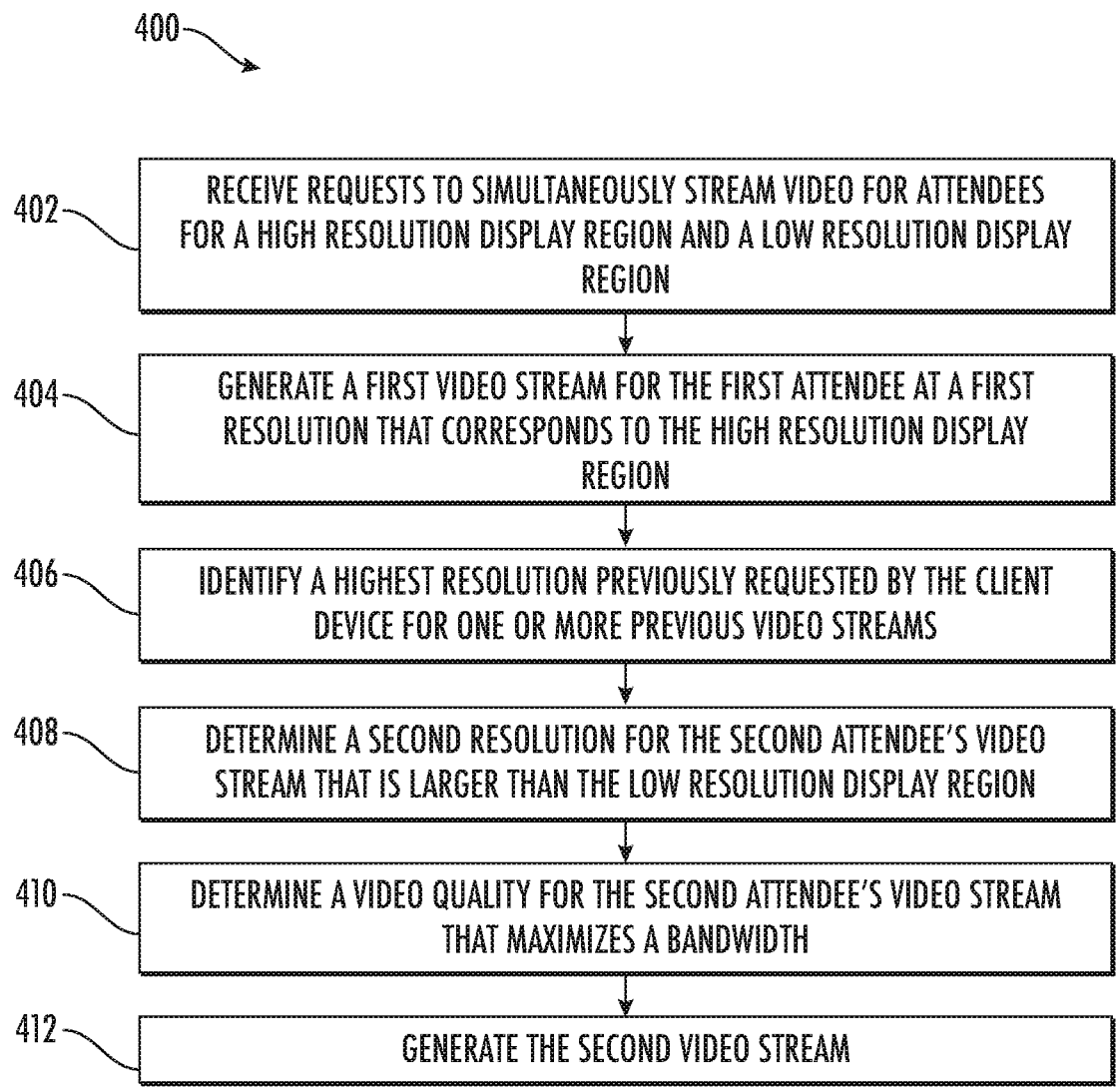
FIG. 4 is a flowchart depicting an example method of generating first and second video streams in large format representations and small format representations in accordance with example embodiments of the present disclosure.

FIG. 4 depicts an example method of generating first and second video streams in large format representations and small format representations in accordance with example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, the method 400 can include receiving requests to simultaneously stream video for attendees for a high-resolution display region and a low-resolution display region. More particularly, one or more computing devices can receive one or more requests to simultaneously stream video associated with a first attendee for a high-resolution display region at a client device and video associated with a second attendee for a low-resolution display region at the client device. The one or more requests can be issued by a client device in association with viewing video streams of a first attendee (e.g., an attendee of a video conference) in a high-resolution display region at the client device (e.g., laptop, smartphone, desktop, etc.) and with a second attendee for a low-resolution display region at the client device. High and low-resolution display regions can refer to a displayed size (e.g., in pixels, etc.) of a respective attendees video stream. As an example, a high-resolution display region can utilize larger area of a display device relative to a low-resolution display region. In some examples, a high-resolution display region may include a majority of a graphical user interface of a user display device (e.g., a "fullscreen" representation, a "large window" representation, etc.). Similarly, for example, a low-resolution display region can utilize a relatively smaller portion of a user display device (e.g., a "thumbnail" representation, a "small window" representation, etc.). In some implementations, the low-resolution display region can be overlaid (e.g., on top of, in front of, etc.) on the high-resolution display region. As an example, a video stream displayed in a high-resolution display region can utilize the entirety of a graphical user interface of the user display device while multiple video streams displayed in low-resolution display regions can be overlaid on the video stream in the high-resolution display region (e.g., as thumbnail streams along the bottom edge or other portion of the high-resolution display region, etc.).

In some implementations, the size of the high and/or low-resolution display regions can be described as a pixel resolution. As an example, the high-resolution display region may be described as having a resolution of 800×800 pixels while the low-resolution display region may be described having as a resolution of 100×100 pixels. Additionally, or alternatively, the size and/or proportions of the respective display regions can be described using some other metric (e.g., size units, units respective to the proportions of a user display device, etc.). As an example, the high-resolution display region can be described as utilizing 75% of the available space (e.g., available number of pixels) of a user display device. In such fashion, a video stream display region can define a respective "size" relative to other display regions, while the actual resolution of the display regions can be extrapolated based on the size and/or capacity of a user display device.

At 404, the method 400 can include generating a first video stream for the first attendee at a first resolution that corresponds to the high-resolution display region. More particularly, in response to the one or more requests, the one or more computing devices can generate a first video stream associated with the first attendee at a first resolution corresponding to the high-resolution display region. The first video stream can be generated at a first resolution (e.g., 1920×1080 pixels, etc.). The first resolution can correspond to the high-resolution display region. As an example, the high-resolution display region can be described as having a resolution of 1920×1080 pixels, and the first resolution can correspond to the resolution of the high-resolution display region. For example, the first stream resolution may have a resolution identical to the described high-resolution display region (e.g., 1920×1080 and 1920×1080, etc.). For another example, the first stream resolution may have a resolution that is substantially similar to the described resolution of the high-resolution display region (e.g., 1280×720 and 1920×1080 respectively, etc.). For yet another example, the first stream resolution may have a resolution that is larger than the high-resolution display region (e.g., 1920×1080 and 1280×720 respectively, etc.).

In some implementations, the high-resolution display region may be described as having certain dimensions and/or proportions (e.g., an aspect ratio, screen percentage, etc.). The first stream resolution can correspond to the high-resolution display region. As an example, the high-resolution display region may be described as having a 16:9 aspect ratio and utilizing 75% of the display space capacity for a user display device. The corresponding first stream resolution can have a resolution matching the 16:9 aspect ratio of the large format (e.g., 1920×1080, etc.) or provide a resolution that is sufficient to enable display on 75% of the display space capacity of user display device(s). In such fashion, the stream resolution can be provided in a manner sufficient to enable the representation of video streams using various display regions (e.g., high or low-resolution display regions, etc.).

At 406, the method 400 can include identifying a highest resolution previously requested for one or more video streams by the client device. A highest resolution that the client device has previously requested for one or more previous video streams can be identified. More particularly, the system can determine a highest resolution of a video stream that was requested by the client device. In some implementations, historical resolution data for previous client device sessions can be stored in one or more computing devices and/or systems that include and/or are otherwise associated with the one or more processors. The historical resolution data can be used to identify a highest previous requested resolution by the client device. As an example, the historical resolution data may indicate that the highest resolution requested by a client device was 1920×1080 pixels. Alternatively, in some implementations, determining the second resolution for the second video stream can include identifying a common and/or preferred resolution for the client device. As an example, the client device can include, within the request, information that identifies a preferred and/or optimal resolution for the second video stream. As another example, the request can include technical details for the client device (e.g., bandwidth allocation, display resolution, hardware components, etc.) that can be used to determine a preferred and/or optimal resolution for the second video stream. As yet another example, the historical resolution data can be analyzed (e.g., using machine-learned model(s), etc.) to determine a preferred and/or optimal resolution for the second video stream.

At 408, the method 400 can include determining a second resolution for the second attendee's video stream that is larger than the low-resolution display region. The second resolution can be determined based on a highest resolution previously requested by the requesting client device. The highest resolution previously requested may be a highest resolution previously requested for any video stream. For example, the resolution may the highest resolution previously requested for the high-resolution display region. More particularly, the one or more computing devices can determine a second resolution for a second video stream associated with the second attendee, wherein the second resolution is larger than a requested resolution for the low-resolution display region. The second resolution can be determined for the second video stream such that the second resolution is larger (e.g., in number of pixels, etc.) than the equivalent size of the low-resolution display region.

As an example, a low-resolution display region can be described as having a size of 100×100 pixels. The second video stream can be determined to have a size of 1920×1080 pixels. It should be noted that, in some implementations, the size of the second video stream is not necessarily equivalent to the size of the high-resolution display region. As an example, the size of the second video stream may be a size between the high-resolution display region and the low-resolution display region. In such fashion, scaling the second video stream to a high-resolution display region would require relatively less expansion of pixels (and corresponding quality loss). Alternatively, in some implementations, the size of the second video stream can be equal to the high-resolution display region and/or the resolution of the first video stream.

At 410, the method 400 can include determining a video quality for the second attendees' video stream that maximizes a bandwidth associated with the low-resolution display region. The video quality can be determined based at least in part on maximizing use of a bandwidth associated with the small format representation. More particularly, the video quality can be determined so as to maximize the bandwidth allowance allocated to the small format representation. In some implementations, the video quality can be determined using an encoding scheme (e.g., a compression scheme, a codec, etc.). As an example, a second codec can provide relatively lossy encoding (e.g., relatively lower video quality) with a correspondingly lower bandwidth utilization. A first codec can provide relatively lossless encoding (e.g., relatively higher video quality) with a correspondingly higher bandwidth utilization.

More particularly, the codec to be utilized (and corresponding video quality) can be determined based on the bandwidth utilization of both codecs and the bandwidth allowance allocated to the low-resolution display region. As an example, providers (e.g., video conference providers, internet service providers, connectivity providers, etc.) can reduce a bandwidth capacity for a user of a video conferencing service based on previous bandwidth utilization. For example, if a user only utilizes a small amount of bandwidth over a time period (e.g., streaming a low quality 100×100 stream for a low-resolution display region, etc.), a provider can, based on this previous utilization, reduce the predetermined total bandwidth capacity for the user. As such, if the user was to attempt to subsequently stream a 1920×1080 stream for a high-resolution display region, the user's predetermined bandwidth capacity would be insufficient. Accordingly, a video conferencing system in accordance with example embodiments can provide a resolution for the video stream that configured to maximize a predetermined bandwidth (e.g., a predetermined bandwidth capacity, allowance, etc.) such that the user's total bandwidth capacity is undiminished by provider(s).

In some implementations, maximizing the use of the bandwidth associated with the low-resolution display region can include maximizing a bandwidth efficiency value associated with the low-resolution display region. The bandwidth efficiency value can be determined based on the bandwidth required to maintain sufficient bandwidth utilization while also minimizing a total amount of bandwidth used by the client device. More particularly, the bandwidth efficiency value can represent a trade-off between bandwidth utilization and bandwidth expenditure. In such fashion, by maximizing the bandwidth efficiency value the video conferencing system can utilize an optimal amount of bandwidth that maintains bandwidth capacity while also minimizing a bandwidth expenditure by the client device.

At 412, the method 400 can include generating the second video stream. The second video stream can be generated at the second resolution and the determined video quality for the client device. At the client device, the second video stream can be scaled to the resolution of and/or a resolution compatible with the low-resolution display region. As an example, at least one processor of the one or more processors can be located on a client device that displays the video stream(s). The at least one processor at the client device can scale the second video stream to a third resolution that is sufficient to enable display in the low-resolution display region. Additionally, or alternatively, in some implementations, cloud-allocated processor(s) can be utilized to perform scaling operations for the client device when the video stream is received.

Figure 5:
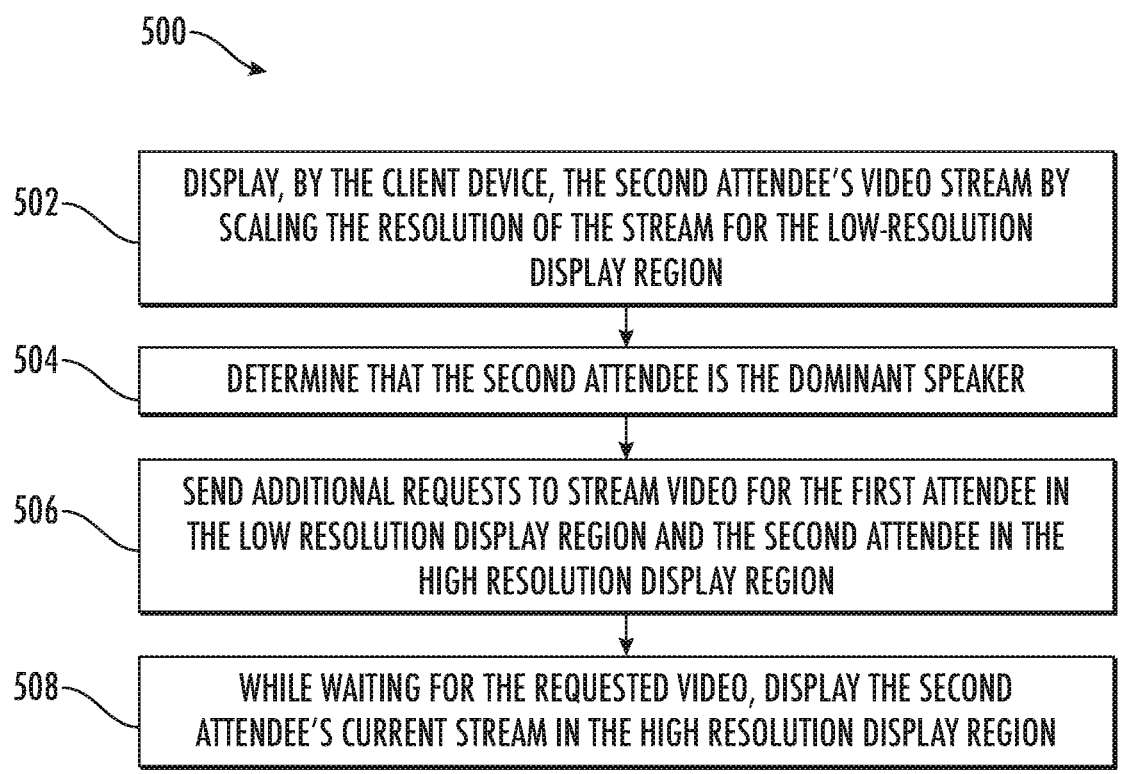
FIG. 5 is a flowchart depicting an example method of generating additional third and fourth video streams in large format representations and small format representations in accordance with example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, the method 500 can include displaying, at the client device, a second attendee's video stream by scaling the resolution of the stream for the small resolution display region. More particularly, the client device can receive a second attendee's video stream with a resolution corresponding to the low-resolution display region. However, the resolution of the second attendee's video stream can be higher than that of the low-resolution display region. As an example, the second attendee's video stream can be 1920×1080 pixels and the low-resolution display region can have a size of 400×200 pixels. A processor of a client device can scale the second attendee's stream resolution to the resolution compatible with the low-resolution display region using a downscaling algorithm (e.g., lanczos filtering, Spline filtering, bilinear interpolation, bicubic interpolation, etc.). In such fashion, the resolution of the second attendee's video stream can vary dynamically at a resolution higher than the low-resolution display region while still being scaled to properly display in the low-resolution display region.

At 504, the method 500 can include determining that the second attendee is the dominant speaker. The dominant speaker can be a speaking "role" assigned to the attendee of the video conference that is currently speaking. As an example, a first attendee who is currently speaking can be assigned the dominant speaker role. The first attendee can stop speaking and the second attendee can begin speaking. A computing device (e.g., the client device, a video conferencing system, a computing system, etc.) can determine that the second attendee is now speaking, and is the dominant speaker. In response, the computing device can assign the dominant speaker role to the second attendee.

At 506, the method 500 can include sending additional requests to stream video for a first attendee in the low-resolution display region and the second attendee in the high-resolution display region. The additional requests can be sent in response to determining that the second attendee is the dominant speaker and the first attendee is a non-dominant speaker. The requests can be sent (e.g., via a network, etc.) to a video conferencing service. In response, the video conferencing service can send requests to the first and second attendees for video streams that respectively correspond to the high-resolution display region and the low-resolution display region. As an example, the additional requests can be sent to the videoconferencing service. The service can send a request to the first attendee requesting a new video stream that corresponds to the low-resolution display region (e.g., a variable and/or lower resolution, a lower video quality, etc.). The service can send an additional request to the second attendee requesting a new video stream that corresponds to the high-resolution display region (e.g., a high-resolution video stream at a relatively higher quality, etc.). However, there can, in some implementations, be a delay between sending the requests to the video conferencing service and receiving new streams that correspond to the respective display regions.

At 508, the method 500 can include displaying, at the client device, the second attendee's current stream in the high-resolution display region while waiting for the requested video stream from the videoconference service. More particularly, the method can include displaying, by the client device and before receiving the new video stream in response to the one or more second requests, the second video stream at the second resolution and the determined video quality in the high-resolution display region. In some implementations, the client device can display the second video stream in the high-resolution display region by scaling the video stream of the second attendee to a resolution corresponding to the high-resolution display region. As an example, low-resolution display region can have a size of 400×200 pixels. The second attendee's video stream can have a resolution of 1280×720, and the high-resolution display region can have a size of 1920×1080 pixels. While waiting for the new streams that correspond to the high-resolution display region, the client device can stop downscaling the 1280×720 stream to the 400×200 low-resolution display region and instead upscale the 1280×720 stream to the 1920×1080 high-resolution display region. In such fashion, the client device can seamlessly provide uninterrupted video streaming service while awaiting the receipt of the new video streams for the second attendee.

Figure 6:
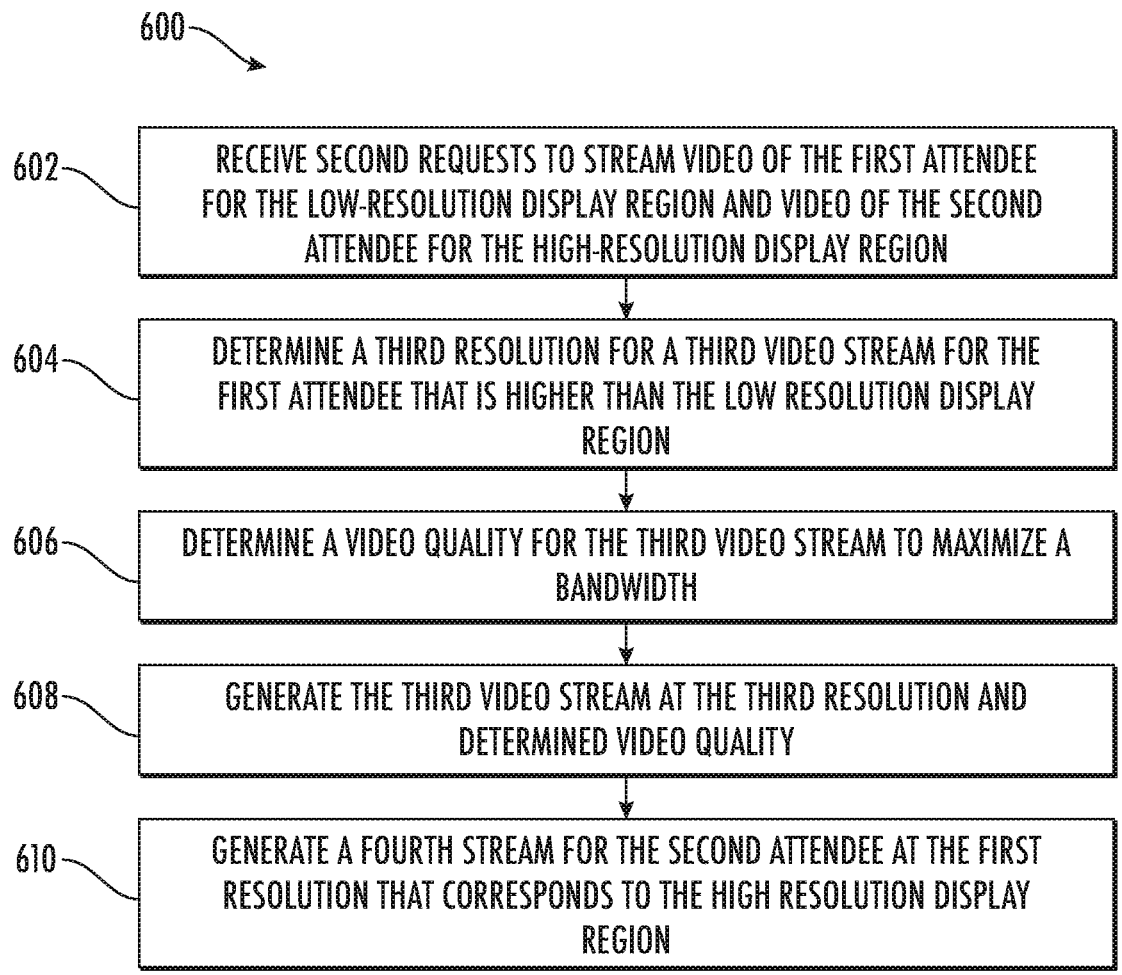
FIG. 6 is a flowchart depicting an example method of displaying a received video stream in a large format representation at a client device in accordance with example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, the method 600 can include receiving second requests to stream video of a first attendee for a low-resolution display region and video of a second attendee for a high-resolution display region. More particularly, the requests can be sent in response to determining that the second attendee is the dominant speaker. The dominant speaker can be a speaking "role" assigned to the attendee of the video conference that is currently speaking. As an example, a first attendee who is currently speaking can be assigned the dominant speaker role. The first attendee can stop speaking and the second attendee can begin speaking. A computing device (e.g., the client device, a video conferencing system, a computing system, etc.) can determine that the second attendee is now speaking, and is the dominant speaker. In response, the computing device can assign the dominant speaker role to the second attendee.

At 604, the method 600 can include determining a third resolution for a third video stream for the first attendee that is higher than the low-resolution display region. As an example, the first attendee's video stream can be 1920×1080 pixels and the low-resolution display region can have a size of 400×200 pixels. As another example, the third resolution can be a variable resolution that fluctuates between 1920×1080 pixels and 1280×720 pixels based on the bandwidth capacity associated with the low-resolution display region. As yet another example, the non-dominant stream resolution may vary based on a bandwidth of the requestor. For example, the third stream resolution may be reduced as the bandwidth of the requestor is reduced (e.g., due to signal loss, service provider bandwidth reductions, etc.). As yet another example, the third stream resolution may vary based on a display quality of the requestor. For example, a non-dominant stream resolution may be reduced for a requestor with a lower quality display (e.g., a lower resolution, etc.). In such fashion, the third resolution can be downscaled to the resolution of the low-resolution display region upon receipt of the video stream by a client device.

At 606, the method 600 can include determining a video quality for the third video stream to maximize a bandwidth. More particularly, the method can include determining a bandwidth based at least in part on maximizing use of the bandwidth associated with the low-resolution display region. In this manner, the third video stream can be provided at an increased resolution and a maximized bandwidth. This, in turn, can preserve the provision of bandwidth capacity by providers and further enable an improved appearance of the video for the particular attendee if the video is enlarged for the high-resolution display region.

In some implementations, the video quality of the third stream can be dynamically selected. More particularly, the selection of the third video stream quality can vary based on maximizing an allocated bandwidth for the low-resolution display region of the requestor. In some implementations, the video quality can be determined using an encoding scheme (e.g., a compression scheme, a codec, etc.). As an example, a first codec can provide relatively lossy encoding (e.g., relatively lower video quality) with a correspondingly lower bandwidth utilization. A second codec can provide relatively lossless encoding (e.g., relatively higher video quality) with a correspondingly higher bandwidth utilization. The codec to be utilized (and corresponding video quality) can vary based on the bandwidth utilization of both codecs and the bandwidth allowance allocated to the low-resolution display region of the requestor.

At 608, the method 600 can include generating the third video stream at the third resolution and determined video quality. In some implementations, the determined video quality can be provided based on the utilization of one or more encoding schemes. More specifically, encoding scheme(s) (e.g., compression schemes, codecs, etc.) can be selected that produce a determined video quality that maximizes the bandwidth allocated to the low-resolution display region. In some implementations, the encoding scheme(s) can be implemented at the client-device level. As an example, the client device associated with the attendee may determine that the video stream associated with the second attendee is being and/or will be displayed in the low-resolution display region. The client device can, in response, utilize different encoding scheme(s) to increase the video quality of the video stream data sent to the one or more processors of the present embodiment.

Alternatively, or additionally, in some implementations, the encoding scheme(s) can be implemented by one or more processors at a server computing device, such as may be associated with a cloud-based service provider. As an example, the one or more processors can determine that the second attendee is being and/or will be displayed in a low-resolution display region. The processor(s) can, in response, utilize different encoding scheme(s) to decrease the video quality of the video stream data provided to one or more client devices associated with one or more other attendees. Upon receipt of the third video stream at the third resolution and the determined video quality, at least one processor at the client device can scale the third video stream to a resolution that is sufficient to enable display in the low-resolution display region.

At 610, the method 600 can include generating a fourth stream for the second attendee at the first resolution that corresponds to the high-resolution display region. More particularly, the fourth resolution can be the same resolution as the first resolution of the first video stream. As an example, the high-resolution display region can be described as having a resolution of 1920×1080 pixels, and the fourth stream resolution can correspond to the resolution of the high-resolution display region. For example, the fourth stream resolution may have a resolution identical to the described high-resolution display region (e.g., 1920×1080 and 1920×1080, etc.). For another example, the fourth stream resolution may have a resolution that is substantially similar to the described resolution of the high-resolution display region (e.g., 1280×720 and 1920×1080 respectively, etc.).

In some implementations, the high-resolution display region may be described as having certain dimensions and/or proportions (e.g., an aspect ratio, screen percentage, etc.). The first stream resolution can correspond to the high-resolution display region. As an example, the high-resolution display region may be described as having a 16:9 aspect ratio and utilizing 75% of the display space capacity for a user display device. The corresponding fourth stream resolution can have a resolution matching the 16:9 aspect ratio of the large format (e.g., 1920×1080, etc.) or provide a resolution that is sufficient to enable display on 75% of the display space capacity of user display device(s). In such fashion, the fourth stream resolution can be provided in a manner sufficient to enable the representation of video streams using various display regions (e.g., high or low-resolution display regions, etc.).

In some implementations, when a non-dominant speaker becomes a dominant speaker, the newly dominant speaker will not display their own stream (e.g., a stream at a first resolution and a first video quality, etc.) in the high-resolution display region. Instead, the newly dominant speaker will continue to display the previously dominant speaker in the high-resolution display region. However, the previously dominant speaker can, in some implementations, switch resolution and video quality to fit a low-resolution display region (e.g., a dynamic resolution and determined video quality, etc.). As such, the quality of the stream in the high-resolution display region can degrade for the newly dominant speaker.

In some implementations, to reduce the impact of the loss of stream quality, the video conferencing system of the present disclosure can switch "subscriptions" of the newly dominant speakers client device for the previously dominant speaker from the current resolution and quality to a high-resolution, high quality video stream by first sending a new key frame that corresponds to the high-resolution, high quality video stream. To do so, the video conferencing system can, in some implementations, immediately send the new key frame as soon as the stream of the previously dominant speaker loses quality. As an example, the previously dominant stream can be assigned a non-dominant speaker role. In response, the bitrate (e.g., the video quality) of the previously dominant speakers stream can gradually be reduced. When the reduction in bitrate is sufficient to visibly reduce quality, the video conferencing system can send the new key frame.

Alternatively, in some implementations, the video conferencing system can send the new key frame as soon as the dominance switch occurs. As an example, a first speaker can be the dominant speaker. A dominance switch can occur that assigns a second speaker the role of dominant speaker. In response, the video conferencing system can immediately send the new key frame to the second speaker for the first speaker's video stream so that the second speaker can quickly subscribe to a high resolution, high quality stream for the first speaker in the high-resolution display region.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
receiving, by one or more processors, one or more requests to simultaneously stream video associated with a first attendee for a high-resolution display region at a client device and video associated with a second attendee for a low-resolution display region at the client device;
generating, by the one or more processors in response to the one or more requests, a first video stream associated with the first attendee at a first resolution corresponding to the high-resolution display region;
identifying, by the one or more processors, a highest resolution previously requested by the client device for one or more previous video streams;
determining, by the one or more processors based on the highest resolution previously requested, a second resolution for a second video stream associated with the second attendee, wherein the second resolution is larger than a requested resolution for the low-resolution display region;
determining, by the one or more processors, a video quality for the second video stream at the second resolution based at least in part on maximizing use of a bandwidth allocation for the low-resolution display region to preserve the bandwidth allocation; and
generating, by the one or more processors in response to the one or more requests, the second video stream at the second resolution and the determined video quality for the client device.

2. The computer-implemented method of claim 1, wherein
maximizing the use of the bandwidth allocation for the low-resolution display region comprises maximizing a bandwidth efficiency value associated with usage of the bandwidth allocation for the low-resolution display region.

3. The computer-implemented method of claim 1, wherein the one or more requests are one or more first requests, the method further comprising:
providing, by the one or more processors in response to the one or more first requests, the second video stream for display at the determined video quality in the low-resolution display region;
generating, by the one or more processors in response to one or more second requests to stream video associated with the second attendee for the high-resolution display region, a third video stream associated with the second attendee at the first resolution and the first video quality; and
providing, by the one or more processors, the third video stream for display at the first resolution and the first video quality in the high-resolution display region.

4. The computer-implemented method of claim 3, further comprising:
displaying, by the client device in association with the one or more first requests, the second video stream at the determined video quality in the low-resolution display region by scaling the second resolution to the requested resolution for the low-resolution display region.

5. The computer-implemented method of claim 1, wherein the bandwidth allocation for the low-resolution display region is a predetermined bandwidth allocation that is allocated for streaming video for the low-resolution display region.

6. The computer-implemented method of claim 1, further comprising:
providing, by the one or more processors to the client device, the first video stream associated with the first attendee at the first resolution; and
providing, by the one or more processors to the client device, the second video stream associated with the second attendee at the second resolution simultaneously while providing the first video stream associated with the first attendee at, the first resolution.

7. The computer-implemented method of claim 1, further comprising:
receiving, by the one or more processors, one or more second requests to stream video associated with the first attendee for the low-resolution display region at the client device and video associated with the second attendee for the high-resolution display region at the client device:
in response to the one or more second requests:
determining, by the one or more processors, a third resolution for a third video stream associated with the first attendee such that the third resolution is larger than the requested resolution for the low-resolution display region;
determining, by the one or more processors, a video quality for the third video stream based at least in part on maximizing use of the bandwidth allocation for the low-resolution display region to preserve the bandwidth allocation;
generating, by the one or more processors, the third video stream at the third resolution and the determined video quality for the third video stream; and
generating, by the one or more processors, a fourth video stream associated with the second attendee at the first resolution corresponding to the high-resolution display region.

8. The computer-implemented method of claim 7, wherein the one or more requests are one or more first requests associated with the first attendee as a dominant speaker, the method further comprising:
determining, by the one or more processors, that the second attendee is the dominant speaker;
in response to determining that the second attendee is the dominant speaker, generating, by the client device, the one or more second requests; and
displaying, by the client device and before receiving the fourth video stream in response to the one or more second requests, the second video stream at the second resolution and the determined video quality in the high-resolution display region.

9. The computer-implemented method of claim 7, wherein the third resolution for the third video stream associated with the first attendee is equivalent to the first resolution for the first video stream associated with the first attendee.

10. The computer-implemented method of claim 1, wherein:
the one or more requests are one or more first requests, and;
the method further comprises:
providing, by the one or more processors in response to the one or more first requests, the second video stream for display at the determined video quality in the low-resolution display region; and providing, by the one or more processors in response to one or more second requests to stream video associated with the second attendee for the high-resolution display region, the second video stream at the first video quality.

11. The computer-implemented method of claim 7, further comprising:
providing, by the one or more processors to the client device, one or more hey frames followed by the fourth video stream, the fourth video stream comprising a subsequent plurality of frames.

12. The computer-implemented method of claim 11, wherein each frame of the subsequent plurality of frames respectively describes a difference between such frame and a respectively preceding frame of the subsequent plurality of frames.

13. The computer-implemented method of claim 7, wherein a fourth video quality of the fourth video stream is higher than the determined video quality of the second video stream.

14. The computer-implemented method of claim 7, wherein generating the fourth video stream associated with the second attendee at the first resolution corresponding to the high-resolution display region comprises applying, by the one or more processors, an alternative encoding scheme to the fourth video stream, the alternative encoding scheme configured to increase the video quality of the fourth video stream relative to the video quality of the second video stream.

15. A computing system, comprising:
one or more processors; and
one or more non-transitory, computer-readable media that store instructions that when executed by the one or more processors cause the computing system to perform operations, the operations comprising:
receiving one or more requests to simultaneously stream video associated with a first attendee for a high-resolution display region at a client device and video associated with a second attendee for a low-resolution display region at the client device;
generating, in response to the one or more requests, a first video stream associated with the first attendee at a first resolution corresponding to the high-resolution display region;
identifying a highest resolution previously requested by the client device for one or more previous video streams;
determining, based on the highest resolution previously requested, a second resolution for a second video stream associated with the second attendee, wherein the second resolution is larger than a requested resolution for the low-resolution display region;
determining a video quality for the second video stream at the second resolution based at least in part on maximizing use of a bandwidth allocation for the low-resolution display region to preserve the bandwidth allocation; and
generating, in response to the one or more requests, the second video stream at the second resolution and the determined video quality for the client device.

16. The computing system of claim 15, wherein maximizing the use of the bandwidth allocation for the low-resolution display region comprises maximizing a bandwidth efficiency value associated with usage of the bandwidth allocation for the low-resolution display region.

17. The computing system of claim 15, wherein the one or more requests are one or more first requests, the operations further comprising:
providing in response to the one or more first requests, the second video stream for display at the determined video quality in the low-resolution display region at the client device;
generating, in response to one or more second requests to stream video associated with the second attendee for the high-resolution display region, a third video stream associated with the second attendee at the first resolution and the first video quality; and
providing the third video stream for display at the first resolution and the first video quality in the high-resolution display region at the client device.

18. The computing system of claim 17, wherein the operations further comprise:
displaying the second video stream at the determined video quality in the low-resolution display region at the client device by scaling the second resolution to the requested resolution for the low-resolution display region.

19. The computing system of claim 15, wherein the one or more requests are one or more first requests associated with the first attendee as a dominant speaker, the operations further comprising:
determining that the second attendee is the dominant speaker;
in response to determining that the second attendee is the dominant speaker, generating one or more second requests to stream video associated with the first attendee for the low-resolution display region at the client device and video associated with the second attendee for the high-resolution display region at the client device; and
displaying, by the client device and before receiving video in response to the one or more second requests, the second video stream at the second resolution and the determined video quality in the high-resolution display region.

20. One or more non-transitory computer-readable media that store instructions that, when executed by one or more processors of a computing system, cause the computing system to perform operations comprising:
receiving one or more requests to simultaneously stream video associated with a first attendee for a high-resolution display region at a client device and video associated with a second attendee for a low-resolution display region at the client device;
generating, in response to the one or more requests, a first video stream associated with the first attendee at a first resolution corresponding to the high-resolution display region; identifying a highest resolution previously requested by the client device for one or more previous video streams;
determining, based on the highest resolution previously requested, a second resolution for a second video stream associated with the second attendee, wherein the second resolution is larger than a requested resolution for the low-resolution display region;
determining a video quality for the second video stream at the second resolution based at least in part on maximizing use of a bandwidth allocation for the low-resolution display region to preserve the bandwidth allocation; and generating, in response to the one or more requests, the second video stream at the second resolution and the determined video quality for the client device.

* * * * *